United States Patent
Ernst

[11] Patent Number: 5,808,190
[45] Date of Patent: Sep. 15, 1998

[54] AIR PRESSURE CONTROL SYSTEM

[75] Inventor: Gerhard Ernst, Hanover, Germany

[73] Assignee: Continental Aktienegesellschaft, Hanover, Germany

[21] Appl. No.: 854,269

[22] Filed: May 9, 1997

[30] Foreign Application Priority Data

May 9, 1996 [DE] Germany ............... 196 18 658.7

[51] Int. Cl.$^6$ ............... B60C 23/00
[52] U.S. Cl. .......... 73/146.5; 73/146.2; 73/146.4; 116/34 R; 200/61.22; 340/445
[58] Field of Search ............... 73/146.2, 146.3, 73/146.4, 146.5; 116/34 R; 200/61.22; 340/442, 445, 446, 447

[56] References Cited

U.S. PATENT DOCUMENTS

| | | | |
|---|---|---|---|
| 5,218,862 | 6/1993 | Hurrel, II et al. | 73/146.5 |
| 5,289,160 | 2/1994 | Fiorletta | 73/146.5 |
| 5,483,220 | 1/1996 | Kushimoto et al. | 73/146.2 |
| 5,505,080 | 4/1996 | McGhee | 73/146.5 |
| 5,524,482 | 6/1996 | Kushimoto et al. | 73/146.2 |
| 5,540,092 | 7/1996 | Handfield et al. | 73/146.5 |
| 5,569,848 | 10/1996 | Sharp | 73/146.2 |
| 5,602,524 | 2/1997 | Mock et al. | 73/146.2 |
| 5,604,307 | 2/1997 | Iida et al. | 73/146.2 |
| 5,675,314 | 10/1997 | Chaklader | 73/146.5 |
| 5,708,411 | 1/1998 | Hill | 73/146.2 |
| 5,721,528 | 2/1998 | Boesch et al. | 73/146.2 |
| 5,731,754 | 3/1998 | Lee, Jr. et al. | 73/146.4 |

FOREIGN PATENT DOCUMENTS

| | | |
|---|---|---|
| 2528352 | 1/1976 | Germany . |
| 3630116 | 3/1988 | Germany . |
| 3741818 | 5/1989 | Germany . |
| 4205911 | 9/1993 | Germany . |
| 4409816 | 9/1994 | Germany . |

*Primary Examiner*—Richard Chilcot
*Assistant Examiner*—Eric S. McCall
*Attorney, Agent, or Firm*—Walter Ottesen

[57] ABSTRACT

The invention is directed to a method for allocating the wheel positions to air pressure control devices (6a to 6d) in an air pressure control system and is directed to an air pressure control system for carrying out the method. First measuring devices are provided which are permanently allocated to air pressure control devices 6a to 6d, and a second set of measuring devices 4a to 4d is provided which are permanently assigned to the wheel positions of the motor vehicle. The first measuring devices and the second measuring devices measure a same measurement value. The measurement values measured by the first measuring devices 16a to 16d and the measurement values measured by the second measuring devices 4a to 4d are transmitted to a central unit 10. In addition, the air pressure control devices each transmit an individual identifier to the central unit 10. The central unit 10 then allocates each air pressure control device to a wheel position at which the measurement value from a first measuring device 16a to 16d is sufficiently close to that measured by a second measuring device 4a to 4d.

10 Claims, 2 Drawing Sheets

AIR PRESSURE CONTROL SYSTEM

FIELD OF THE INVENTION

The invention relates to a method for carrying out the allocation of the wheel position to the air pressure control devices in an air pressure control system of a motor vehicle. The air pressure control system includes the following:

(a) a number of wheels with each wheel being allocated an air pressure control device, which, in turn, is adapted to transmit an individual identifier to a central unit; and, (b) the central unit is adapted to store the allocation (identifier of the air pressure control device and wheel position) for each wheel.

In the above method, the allocation of the air pressure control devices to the wheel positions is performed in accordance with the following steps:

(i) switching into an allocation mode;

(ii) transmitting individual identifiers of the air pressure control devices;

(iii) in the central unit, evaluating which individual identifier of which wheel position had been transmitted;

(iv) storing the determined allocation in the central unit; and, (v) switching off the allocation mode and operating the air pressure control system in a pressure monitoring mode.

The invention also relates to an air pressure control system of a motor vehicle.

BACKGROUND OF THE INVENTION

The correct adjustment of the air pressure of the motor vehicle wheels is important for several reasons. On the one hand, an air pressure which is too high or an air pressure which is too low leads to increased tire wear so that the vehicle tires must be replaced prematurely which causes unnecessary cost. On the other hand, especially an air pressure which is too low, constitutes a considerable safety risk because it causes increased flexure work of the tire side walls which, in turn, causes the temperature of the tire of the vehicle to greatly increase. As a consequence of this condition, the strength of the tire side walls is greatly reduced which can cause the tire to burst and can lead to serious traffic accidents especially at high speed.

For the reasons advanced above, the air pressure of the vehicle tire must be checked regularly, which is a task often omitted for various reasons by the driver of the vehicle. For this reason, air pressure control systems have been developed which include an air pressure control device allocated to each wheel. The air pressure control device automatically measures the air pressure of the vehicle tires and announces at least a critical deviation from the desired air pressure to the driver of the vehicle. The air pressure control devices can, for example, be vulcanized into the tires or can be mounted therein with adhesive or can be attached to or in the valve or in the wheel rim. Corresponding configurations are known.

German patent publication 4,205,911 discloses an air pressure control system wherein an air pressure control device is allocated to each tire of the motor vehicle. Each air pressure control device transmits a measured pressure signal at regular intervals to a central unit together with an individual identifier. The transmission of individual identifiers together with the pressure signal is especially important because data is transmitted from the tires to the motor vehicle without contact. In this connection, reference can be made to the above-mentioned German patent publication 4,205,911. For this reason, it must, for example, be precluded that air pressure data of a neighboring motor vehicle are received (for example, in heavy traffic) and that incorrect announcements reach the driver based on this data from another vehicle. Such crossover is prevented by the individual identifiers because the tires of another motor vehicle would transmit different individual identifiers.

In the central unit, value pairs of the form (identifier of the air pressure control device and wheel position) are stored for each wheel of the vehicle so that a conclusion can be drawn via a corresponding comparison in the central unit as to which identifier is transmitted with the corresponding pressure signal of which wheel position of the vehicle. A deviation of the transmitted pressure signal from a pregiven value to a wheel position is indicated to the driver of the vehicle by the central unit so that the driver can initiate suitable measures.

Experience has shown that the air pressure control system disclosed in German patent publication 4,205,911 operates without difficulty only when the allocations (identifier of the air pressure control device and wheel position) are correctly stored in the central unit. Correspondingly, it must be ensured on the one hand that these allocations do not change during the operation of the motor vehicle and, on the other hand, a new allocation must be undertaken on the vehicle with each change of a tire. In order to satisfy these two peripheral conditions, a manually actuable switch is provided in the air pressure control system known from German patent publication 4,205,911. This switch can only be actuated during standstill of the vehicle and the air pressure control system must be transferred after an exchange of tires from a pressure monitoring mode to an allocation mode.

In the allocation mode, an allocation of the new vehicle tires with the new air pressure control devices contained therein to the wheel positions takes place, for example, in that the intensity of the signals, which are transmitted by the individual air pressure control devices, is measured by the receivers (a receiver is permanently allocated to each of the wheel positions) and each signal, which is transmitted by an air pressure control device, is allocated to that wheel position of the vehicle tire at which wheel position it generates the highest signal intensity. For example, the signal intensity of the air pressure control device, which is located in the forward-left tire is greatest at that receiver which is allocated to the forward-left wheel position so that a corresponding allocation can be determined. The corresponding allocations are stored in the central unit.

The allocation method explained above is relatively unreliable because all signals are received with almost the same intensity at each receiver because of the high signal intensities; this does not permit a clear allocation of the air pressure control devices in the tires to the wheel positions with the aid of the signal intensities. Furthermore, four receivers are necessary for this allocation method. These receivers must all be connected to the central unit and this increases the cost of the air pressure control system.

For the above reasons, the suggestion is made in German patent publication 4,205,911 to provide only one receiver and to actively undertake the allocation in that a pressure change is made manually at a permanently pregiven wheel position and the central unit checks at which individual identifier the pressure change has occurred. The corresponding allocation (identifier of the air pressure control device and wheel position) is then stored.

Although this allocation method is believed to be very reliable, it can however only be carried out with considerable effort and probably not at all by a person not provided with adequate training.

SUMMARY OF THE INVENTION

It is an object of the invention to provide a method for carrying out the allocation of the air pressure control devices to the wheel positions which can be performed easily and permits a reliable allocation. It is also an object of the invention to provide an air pressure control system for carrying out the method of the invention.

The method of the invention proceeds from the type discussed above. The allocation of the air pressure control devices to the wheel positions is carried out in an allocation mode as delineated below.

(a) During operation of the vehicle, a quantity is measured at each wheel of the motor vehicle with first measuring devices which are allocated to respective air pressure control devices of corresponding ones of the tires. The quantity assumes a characteristic value for each wheel of the vehicle at least from time to time.

(b) The same quantity is measured during operation of the vehicle at each wheel of the vehicle with second measuring devices. These second measuring devices are fixed in location and allocated to a wheel position and are attached to the motor vehicle. The allocation of the second measuring devices to the wheel positions is known at the central unit.

(c) The quantities measured by the first measuring devices are transmitted to the central unit at least together with the individual identifiers of the air pressure control devices.

(d) The values, which are measured by the second measuring devices, are likewise transmitted to the central unit so that allocations of the form (measured value/ wheel position) are present in the central unit.

(e) The values, which are measured by the first measuring devices, are compared to the values measured by the second measuring devices. If the correspondence of the measured values is satisfactory, then the conclusion is drawn that the identifier, which is transmitted together with the first measured value, corresponds to the wheel position at which a measured value had been measured with adequate coincidence by the second measuring device to the measured value of the first measuring device.

(f) The received allocation (identifier of the air pressure control device and wheel position) is stored in the central unit.

With respect to the above adequate correspondence, it is meant that the measured values of the first measuring devices and the measured values of the second measuring devices correspond to each other except for nonuniformities which cannot be avoided with measurement technology. In this way, a clear allocation is possible.

The basic idea of the invention is seen in that a measurement quantity is measured at each wheel position of the motor vehicle by two independent measuring devices. The wheel position is known from one measuring device and the other measuring device is part of the air pressure control device which is located in the tire of the motor vehicle.

The advantages of the invention are especially that the allocation method is carried out automatically after switching on the allocation mode and therefore does not require trained personnel. Specifically, the driver can initiate carrying out the allocation method, for example, after a change of tires. Furthermore, the method leads to a reliable allocation since only quantities are used as measurement values which, at each wheel of the motor vehicle, exhibit at least temporarily an adequate "individuality". A further advantage of the invention is that the method can be carried out with only one receiver because no receivers are required which are permanently allocated to each wheel position (as is, for example, the case for the signal intensity measurement as described above). Accordingly, complex cabling of several receivers to the central unit is not needed which, overall, reduces the cost of the air pressure control system.

It has been shown that a measurement, which is based on quantities individual to each wheel, can be carried out in a short time span because individual measurement values are almost always present at the wheels of the vehicle for various reasons. As measurement quantity, the wheel rpm (revolutions per unit of time) has, for example, been shown to be suitable or any measurement quantity from which the wheel rpm can be derived. These measurement quantities are measured by sensors, which are allocated to the air pressure control devices, as well as by sensors which are allocated to each wheel of the vehicle. The wheel rpm of the individual wheels of the motor vehicle differs, for example, as the vehicle goes through a turn. However, even for straight-ahead driving, individual wheel rpms are already present which are adequate for an allocation of the air pressure control devices to the wheel positions. The wheel rpms of the individual wheels are different in straight-ahead travel because of different wear or because of different manufacturing tolerances.

Sensors which are suitable for allocation to the air pressure control devices and for detecting the wheel rpms include the following: magnet-field sensors, centrifugal force sensors, gravitational force sensors and acceleration sensors. Gravitational force sensors have proved especially suitable wherein a small mass generates a charge displacement in synchronism with the rotational angle of the wheel. The small mass is in an element which operates piezoelectrically. For example, in an element of this kind, a charge displacement is always generated by the applied pressure when a tire of the motor vehicle (and therewith the element contained in the tire) passes through the point at which the tire is in contact with the road.

The number of generated charge displacement cycles is counted in an evaluation circuit of the sensor. At the same time, the time is measured with the aid of a time element contained in the evaluation circuit. The wheel rpm (rotations per unit of time) can be determined in the evaluation circuit in that it is determined how many revolutions the wheel makes in a fixed pregiven time interval with the corresponding sensor or which time interval is needed for a fixed number of revolutions.

For example, sensors of the antiblocking system can be used as sensors which measure the wheel rpm and are permanently allocated the individual wheels or wheel positions of the motor vehicle. These sensors of the antiblocking system are anyway present in many motor vehicles so that additional sensors are not needed. The use of already available sensors such as the antiblocking sensors contributes still further to reducing the cost of the air pressure control system.

The noise development, vibration behavior or the tire temperature can be measured at the individual wheels of the motor vehicle by the first and second measuring devices as an alternative to measuring wheel rpm. Here, too, it has been shown that the corresponding measurement quantities exhibit an adequate individuality. Corresponding sensors are known for measuring the above-mentioned quantities so that these sensors are not explained in greater detail herein.

According to another embodiment of the invention, switching on and carrying out the allocation mode takes place as follows:

(a) automatically switching on the allocation mode before or when the motor vehicle is started;

(b) allocating the air pressure control devices to the wheel positions; and, (c) automatically moving out of the allocation mode after allocation is completed.

An automatic switch-on of the allocation mode when starting the motor vehicle can, for example, take place when switching on the ignition or by actuating the starting motor. The advantages achieved with this embodiment are especially seen in that a manual switchover from a pressure monitoring mode to an allocation mode is unnecessary. The safety of the motor vehicle is considerably increased with this embodiment because a switch-on of the allocation mode cannot be forgotten when the switch-on of the allocation mode takes place automatically. A further advantage of this embodiment is that improper operation on the part of the operator is precluded. Finally, the operating comfort of the air pressure control system is increased with this automation.

According to a feature of the above embodiment, the method is carried out each time the motor vehicle is started. In this way, it is ensured that a change of tires is always detected and a new allocation of the air pressure control devices to the wheel positions is carried out. This tire change is carried out between the last standstill and the next start-up of the vehicle.

According to still another feature of the invention, the method is always then carried out when the motor vehicle has been at standstill longer than a pregiven time span. A pregiven time span can, for example, be detected by a time element in the central unit. The advantage of this embodiment is that the method is carried out not after every standstill of the motor vehicle but only then when the duration of the standstill has exceeded a pregiven time span. The pregiven time span is selected so as to have a duration which precludes that there is a wheel change within this time span. Such a time span can, for example, be five to thirty minutes. The advantage of this embodiment is that a new allocation is not always carried out and the actual allocation is stored in the central unit already when the start of a trip takes place.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
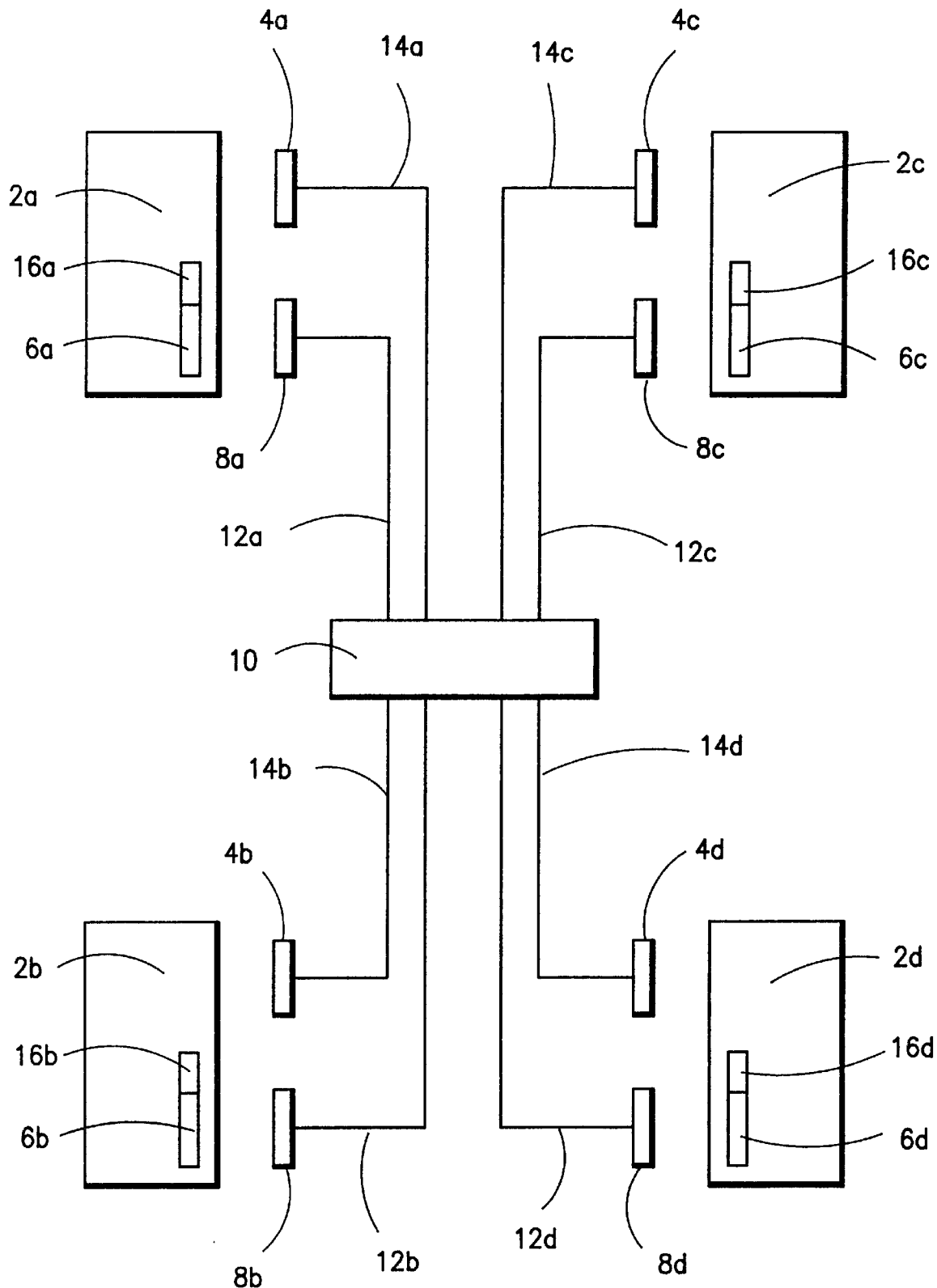
FIG. 1 is a schematic of a motor vehicle equipped with an air pressure control system according to a first embodiment of the invention; and, FIG. 2 is a schematic of a motor vehicle equipped with an air pressure control system according to a second embodiment of the invention.

FIG. 1 shows a motor vehicle having wheels 2a to 2d and being equipped with an air pressure control system. The air pressure control system includes, inter alia, air pressure control devices 6a to 6d contained in respective tires of the motor vehicle wheels 2a to 2d. For example, the control devices can be in the rubber of the tire or in a valve. On the other hand, the air pressure control devices 6a to 6d can be allocated to respective ones of the tires by being, for example, appropriately positioned and attached to the respective rims. The air pressure control devices 6a to 6d include a transmitter via which they transmit to respective receivers 8a to 8d which are allocated to the air pressure control devices 6a to 6d. The transmission is without contact.

Furthermore, the air pressure control devices 6a to 6d include respective sensors 16a to 16d having functions which will be explained hereinafter. The receivers 8a to 8d receive data from the air pressure control devices 6a to 6d and transmit this data via respective transmission paths 12a to 12d to a central unit 10. The receivers 8a to 8d can also be replaced by a single receiver which, for example, is mounted in the central unit 10 and receives the signals of all air pressure control devices 6a to 6d. In this case, the transmission paths 12a to 12d from the receivers 8a to 8d to the central unit are not needed. In the simplest case, the receivers 8a to 8d or the individual receiver are configured as receiving antennas.

In addition to the sensor 16a to 16d, the air pressure control system includes sensors 4a to 4d which are attached to the motor vehicle and are allocated to respective wheels 2a to 2d of the vehicle. The sensors 4a to 4d are connected via transmission paths 14a to 14d, respectively, to the central unit 10.

In the following, the operation of the air pressure control system is explained. Before or when the vehicle is started, the allocation mode of the air pressure system is automatically switched on. This takes place in that a subprogram "allocation mode" is called up in a microprocessor of the central unit 10 and is then worked through and the allocation is controlled.

Sensors 16a to 16d are allocated to the air pressure control devices 6a to 6d, respectively. In the allocation mode, measurement quantities from the sensors 16a to 16d as well as measurement quantities from sensors 4a to 4d are received and are evaluated in the central unit 10. These measurement quantities are individual during operation of the motor vehicle at least from time to time for each wheel (2a to 2d) of the vehicle. In the following example, it is assumed that the wheel rpms of the individual wheels 2a to 2d of the vehicle are the measurement quantities and the sensors 16a to 16d and sensors 4a to 4d are correspondingly configured as rpm sensors. The wheel rpms measured by sensors 16a to 16d are transmitted together with the individual identifiers of the air pressure control devices 6a to 6d and the pressure values as well as additional measurement values (if required) to the respective receivers 8a to 8d and are from there transmitted via the transmission paths 12a to 12d to the central unit 10. In the central unit 10, value pairs (individual identifier of an air pressure control device and wheel rpm) are present for each wheel (2a to 2d of the vehicle). However, from these value pairs, it is not yet known from which wheel position the value pairs have been transmitted.

The wheel rpms, which are measured by the sensors 4a to 4d, are transmitted via respective transmission paths 14a to 14d likewise to the central unit 10. The sensors 4a to 4d are permanently allocated to respective individual wheels 2a to 2d of the motor vehicle. For this reason, the central unit 10 knows at which wheel position the corresponding wheel rpm was measured (because of the fixed allocation, the central unit 10 knows, for example, that the sensor 4a transmits the wheel rpm of the forward-left vehicle wheel 2a).

In the central unit 10, all the wheel rpms transmitted from the sensors 16a to 16d are compared to all the wheel rpms transmitted by the sensors 4a to 4d. The sensors 16a to 16d correspond to air pressure control devices 6a to 6d. A fixed allocation of an air pressure control device 6a to 6d to a wheel position is then undertaken in the central unit 10 when the wheel rpms (which is measured by sensors 16a to 16d) correspond with adequate precision to the wheel rpms measured by sensors 4a to 4d. The corresponding allocation (individual identifier of an air pressure control device and wheel position) is then stored in the central unit 10 when the wheel rpm measured by sensor 16a is compared to the wheel rpm measured by the sensor 4a (for example, a coincidence of the measured wheel rpms is present). The central unit knows that the correspondingly measured wheel rpms originate from the wheel 2a (forward-left) because the sensor 4a is permanently allocated to this wheel position (forward-left). Correspondingly, the central unit 10 matches the individual identifier of the wheel position (forward-left) of the wheel 2a and stores the same. The individual identifier is transmitted by the air pressure control device 6a. The same procedure applies to the other wheel positions. If all corresponding allocations are determined in this manner and stored, the allocation is completed and the program moves automatically out of the allocation mode. This can, for example, take place when, after the storage of the allocations, there is a movement out of the subprogram "allocation mode" of a microprocessor of the central unit 10.

EXAMPLE

The value series ($K_1$; 100; 2.0); ($K_2$; 115; 2.0); ($K_3$; 105; 2.2); ($K_4$; 120; 2.2) from the four air pressure control devices 6a to 6d reach the central unit 10. Here, $K_i$ (i=1 . . . 4) is the identifier in each case. The center value in each set of parentheses is the wheel rpm and the last value in the parentheses is the pressure. The central unit 10 at first does not know from which wheel position the value series originates. In addition, the measured wheel rpms from the respective rpm sensors 4a to 4d reach the central unit 10. In this case, for example, 98 from sensor 4a, 113 from sensor 4c, 105 from sensor 4b and 122 from sensor 4d. Based on the permanent allocation of sensors 4a to 4d to the wheel positions, the central unit 10 knows that the rpm 98 was measured at the wheel 2a (forward-left), the rpm 113 at the wheel 2c (forward-right), the rpm 105 at the wheel 2b (rear-left) and the rpm 122 at the wheel 2d (rear-right). By comparing the wheel rpms, which are measured by the air pressure control devices 6a to 6d, to the wheel rpms, which are measured at the sensors 4a to 4d, the central unit 10 can now allocate the individual identifiers $K_i$ (i=1 . . . 4) to the wheel positions. For this example, the following allocations are made: ($K_1$; wheel position "forward-left" of wheel 2a); ($K_2$; wheel position "forward-right" of the wheel 2c); ($K_3$; wheel position "rear-left" of wheel 2b); ($K_4$; wheel position "rear-right" of wheel 2d) because, at the corresponding wheels, the best coincidence exists between the wheel rpms measured independently of each other. The corresponding allocations are stored in the central unit 10 and are used in the pressure monitoring mode. If a clear allocation on the basis of the measured values cannot be carried out (for example, because at two or more wheels 2a to 2d the same wheel rpms were measured by the sensors 4a to 4d) then the allocation mode is continued until this is possible.

A warning is only triggered by the pressure values transmitted in the allocation mode when there is a drop below a specific minimum pressure value of, for example, 1.2 bar.

The air pressure control system functions in the pressure monitoring mode as known. That is, individual identifiers together with measured pressure values (and further measured values, if required) as well as values of wheel rpms are transmitted to the receivers 8a to 8d and, from there, are transmitted to the central unit 10. In the central unit 10, the transmitted individual identifiers are compared to the stored identifiers and, when there is coincidence, a determination is made from which wheel position the individual identifier with the corresponding pressure value was transmitted. The wheel rpms are not evaluated by the central unit 10 in the pressure monitoring mode. If the transmitted pressure value or one of the other measured quantities at one of the wheels 2a to 2d deviates in an impermissible manner from a pregiven value, then this is announced to the driver of the vehicle so that the driver can initiate corresponding measures.

EXAMPLE

Value series of the form ($K_1$; 150; 1.5); ($K_2$; 153; 2.0); ($K_3$; 149; 2.2); ($K_4$; 147; 2.2) are, in turn, transmitted to the central unit 10 from the air pressure control devices 6a to 6d. Based on the stored allocations (see above), the central unit 10 can determine that the first value series was transmitted from the wheel position "forward-left", the second value series from the wheel position "forward-right", the third value series from the wheel position "rear-left" and the fourth value series from the wheel position "rear-right". This is so because the corresponding individual identifiers in the transmitted value series and in the wheel positions, which are provided in the stored allocation, are coincident. The central unit 10 can now determine that the pressure of 1.5 bar was measured at the wheel position "forward-left", the pressure of 2.0 bar at the wheel position "forward-right" and the pressure of 2.2 was measured at each of the wheel positions "rear-left" and "rear-right". If required, a warning is outputted when one of the measured air pressures deviates from a pregiven value. In this embodiment, a warning can be outputted because the air pressure of 1.5 bar at the wheel position "forward-left" is too low.

Figure 2:
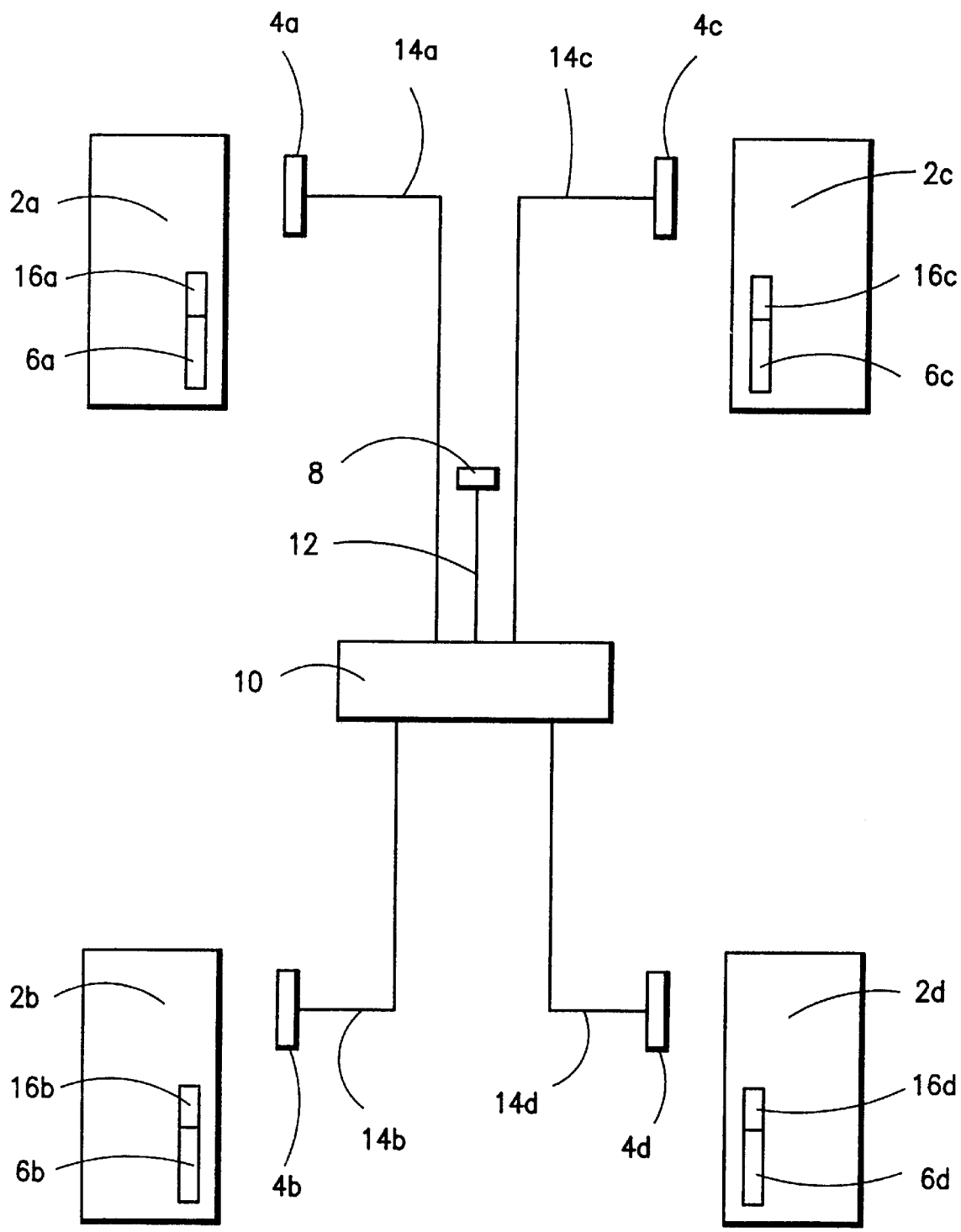

FIG. 2 shows a motor vehicle having wheels 2a to 2d and which has an air pressure control system which is configured as the air pressure system shown in FIG. 1. The difference is only that not each of the air pressure control devices 6a to 6d is allocated to a separate receiver. Instead, only a single receiver 8 (for example, configured as an antenna) is provided which is connected via only one transmission path 12 to the central unit 10. All signals transmitted by the air pressure control devices 6a to 6d are received by the receiver 8 and are transmitted via transmission path 12 to the central unit 10. The operation of the air pressure control system shown in FIG. 2 is identical to the operation of the air pressure control system shown in FIG. 1 so that the description presented above can be referred to.

It is understood that the foregoing description is that of the preferred embodiments of the invention and that various changes and modifications may be made thereto without departing from the spirit and scope of the invention as defined in the appended claims.

What is claimed is:

1. A method for carrying out an allocation of wheel position to air pressure control devices of an air pressure control system of a motor vehicle having a plurality of wheels and said air pressure control devices being assigned to corresponding ones of said wheels; said air pressure control system further including: a central unit; said air pressure control devices having respective individual identifiers and each one of said air pressure control devices being adapted to transmit the identifier thereof; the method comprising the steps of:

providing a plurality of first measuring devices assigned to corresponding ones of said air pressure control devices;

measuring a quantity on the wheel with the first measuring device corresponding to said wheel and providing a first measured value thereof with said quantity being characteristic of said wheel;

providing a plurality of second measuring devices fixedly mounted on said vehicle and assigned to respective wheel positions of said vehicle to also measure said quantity and provide a plurality of second measured values originating at respective ones of said wheel positions;

adapting said central unit to store the assignment of said second measuring devices to said wheel positions, respectively;

transmitting to said central unit the identifier of each one of said air pressure control devices and the first measured value as measured by the first measuring device allocated to said one air pressure control device whereby a plurality of said identifiers and a plurality of said first measured values corresponding respectively thereto are transmitted;

transmitting to said central unit said second measured values of said second measuring devices;

comparing the first measured values to said second measured values in said central unit and, with sufficient coincidence between a first one of said first measured values and a first one of said second measured values, drawing a conclusion that the identifier, which is transmitted together with said first one of said first measured values, belongs to the wheel position of the second measuring device from which the first one of said second measured values originated thereby establishing a first allocation (identifier/wheel position); and, storing said first allocation (identifier/wheel position) in a memory of said central unit.

2. The method of claim 1, wherein said means of said central unit is adapted to determine sufficient coincidence between a second one of said first measured values and a second one of said second measured values and drawing a conclusion that the identifier, which is transmitted together with said second one of said first measured values, belongs to the wheel position of the second measuring device from which the second one of said second measured values originated thereby establishing a second allocation (identifier/wheel position); and, storing said second allocation (identifier/wheel position) in a memory of said central unit.

3. The method of claim 1, wherein the quantity measured by said first measuring devices and said second measuring devices is the wheel rpm or a quantity from which the wheel rpm can be derived.

4. The method of claim 1, wherein the quantity measured is selected from the group consisting of noise, vibration and tire temperature.

5. The method of claim 1, comprising the further steps of:
automatically switching said air pressure control system into an allocation mode before or when said vehicle is started up;
allocating said air pressure control devices to said wheel positions, respectively; and,
automatically leaving said allocation mode upon completion of the allocation.

6. The method of claim 5, wherein said method is carried out each time said vehicle is started.

7. The method of claim 6, wherein said method is always carried out when said vehicle has been at standstill longer than a pregiven time span.

8. An air pressure control system of a motor vehicle having a plurality of wheels, the air pressure control system comprising:

a plurality of air pressure control devices allocated to corresponding ones of said wheels;

each one of said air pressure control devices being adapted to transmit an identifier individual to said one air pressure control device;

a central unit;

a plurality of first measuring devices assigned to corresponding ones of said air pressure control devices of said respective wheels;

each of said first measuring devices being adapted to measure a quantity on the wheel corresponding thereto and provide a first measured value thereof with said quantity being characteristic of said wheel;

a plurality of second measuring devices fixedly mounted on said vehicle and assigned to respective wheel positions of said vehicle to also measure said quantity and provide a plurality of second measured values originating at respective ones of said wheel positions;

said central unit being adapted to store the assignment of said second measuring devices to said wheel positions, respectively;

first transmission path means for transmitting the identifier of each one of said air pressure control devices and the first measured value as measured by the first measuring device allocated to said one air pressure control device to said central unit whereby a plurality of said identifiers and a plurality of said first measured values corresponding respectively thereto are transmitted;

second transmission path means for transmitting to said central unit said second measured values of said second measuring devices;

said central unit including means for comparing the first measured values to said second measured values and, with sufficient coincidence between a first one of said first measured values and a first one of said second measured values, drawing a conclusion that the identifier, which is transmitted together with said first one of said first measured values, belongs to the wheel position of the second measuring device from which the first one of said second measured values originated thereby establishing a first allocation (identifier/wheel position); and, said central unit including a memory in which said first allocation (identifier/wheel position) can be stored.

9. The air pressure control system of claim 8, wherein said means of said central unit is adapted to determine sufficient coincidence between a second one of said first measured values and a second one of said second measured values and drawing a conclusion that the identifier, which is transmitted together with said second one of said first measured values, belongs to the wheel position of the second measuring device from which the second one of said second measured values originated thereby establishing a second allocation (identifier/wheel position); and, said memory being adapted to store said second allocation (identifier/wheel position).

10. The air pressure control system of claim 8, wherein further comprises:
means for automatically switching said air pressure control system into an allocation mode before or when said vehicle is started up; and,
means for automatically switching off said allocation mode upon completion of the allocation and for operating said air pressure control system exclusively in a pressure monitoring mode.

* * * * *